(12) United States Patent
Mohanty et al.

(10) Patent No.: US 11,907,775 B2
(45) Date of Patent: Feb. 20, 2024

(54) INTELLIGENT API CONTENT GOVERNANCE FRAMEWORK

(71) Applicant: Dell Products L.P., Round Rock, TX (US)

(72) Inventors: Bijan Kumar Mohanty, Austin, TX (US); Manoj Nambirajan, Hyderabad (IN); Hung Dinh, Austin, TX (US); Mohit Kumar Agarwal, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 17/648,042

(22) Filed: Jan. 14, 2022

(65) Prior Publication Data

US 2023/0229534 A1    Jul. 20, 2023

(51) Int. Cl.
*G06F 9/54* (2006.01)
*G06N 20/00* (2019.01)

(52) U.S. Cl.
CPC ............. *G06F 9/547* (2013.01); *G06N 20/00* (2019.01)

(58) Field of Classification Search
None
See application file for complete search history.

(56) References Cited

U.S. PATENT DOCUMENTS

2020/0133751 A1\* 4/2020 Bahrami ................. G06F 9/54
2020/0192727 A1\* 6/2020 Savenkov ............. G06F 9/547
2020/0326913 A1\* 10/2020 Ying ....................... G06F 9/54

\* cited by examiner

*Primary Examiner* — Syed A Roni
(74) *Attorney, Agent, or Firm* — DALY, CROWLEY, MOFFORD & DURKEE LLP

(57) ABSTRACT

In one aspect, an example methodology implementing the disclosed techniques includes receiving a new application programming interface (API) specification and extracting one or more keywords from the new API specification. The method also includes identifying, using a trained machine learning (ML) model, one or more existing API specifications that are similar to the new API specification based on the one or more keywords from the new API specification and, responsive to the identification, outputting information regarding the one or more existing API specifications that are similar to the new API specification.

18 Claims, 4 Drawing Sheets

INTELLIGENT API CONTENT GOVERNANCE FRAMEWORK

BACKGROUND

An application programming interface (API) is a set of defined rules that describe how computers and applications can communicate with one another. To an application developer, an API simplifies programming by abstracting the underlying implementation and exposing objects or actions the developer requires. An API enables organizations to open up their applications' data and functionality to internal departments within their organizations, business partners, and external third-party developers. For example, organizations with complex information technology (IT) systems may develop APIs for use by their internal programmers (e.g., employees) to integrate and pass data between the IT systems and their multitude of applications, such as software as a service (SaaS) applications, cloud applications, customer relationship management (CRM) applications, enterprise resource planning (ERP) applications, and custom applications, among others. Similarly, organizations that offer services, such as cloud computing services, to customers may develop APIs for use by their customers to integrate with the purchased cloud services and cloud applications.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer implemented method includes receiving a new application programming interface (API) specification and extracting one or more keywords from the new API specification. The method also includes identifying, using a trained machine learning (ML) model, one or more existing API specifications that are similar to the new API specification based on the one or more keywords from the new API specification and, responsive to the identification, outputting information regarding the one or more existing API specifications that are similar to the new API specification.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including receiving a new application programming interface (API) specification and extracting one or more keywords from the new API specification. The process also includes identifying, using a trained machine learning (ML) model, one or more existing API specifications that are similar to the new API specification based on the one or more keywords from the new API specification and, responsive to the identification, outputting information regarding the one or more existing API specifications that are similar to the new API specification.

In some embodiments, the new API specification corresponds to a new API that is being designed.

In some embodiments, the outputting includes ordering the one or more existing API specifications according to similarity to the new API specification.

In some embodiments, the one or more extracted keywords are indicative of a context and intent of the new API specification.

In some embodiments, the identifying one or more existing API specifications further includes generating a feature vector based on the extracted one or more keywords and using the feature vector and the trained ML model to predict the one or more existing API specifications that are similar to the new API specification. In one aspect, generating the feature vector includes using Term Frequency-Inverse Document Frequency (TF-IDF).

In some embodiments, the identifying one or more existing API specifications is based on cosine similarity.

In some embodiments, the trained ML model includes a set of feature vectors corresponding to a plurality of existing API specifications.

In some embodiments, the new API specification is received from an API marketplace associated with an organization.

In some embodiments, the new API specification is received from an API design tool associated with an organization.

In some embodiments, the new API specification is received from an API runtime associated with an organization.

According to another illustrative embodiment provided to illustrate the broader concepts described herein, a non-transitory computer readable medium stores program instructions that are executable to, by a computing device, receive a new application programming interface (API) specification and extract one or more keywords from the new API specification. The program instructions are also executable to, by the computing device, identify, using a trained machine learning (ML) model, one or more existing API specifications that are similar to the new API specification based on the one or more keywords from the new API specification and, responsive to the identification, output information regarding the one or more existing API specifications that are similar to the new API specification.

In some embodiments, to output includes to order the one or more existing API specifications according to similarity to the new API specification.

In some embodiments, to identify one or more existing API specifications further includes to generate a feature vector based on the extracted one or more keywords and to use the feature vector and the trained ML model to predict the one or more existing API specifications that are similar to the new API specification. In one aspect, to generate the feature vector includes using Term Frequency-Inverse Document Frequency (TF-IDF).

In some embodiments, to identify one or more existing API specifications is based on cosine similarity.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
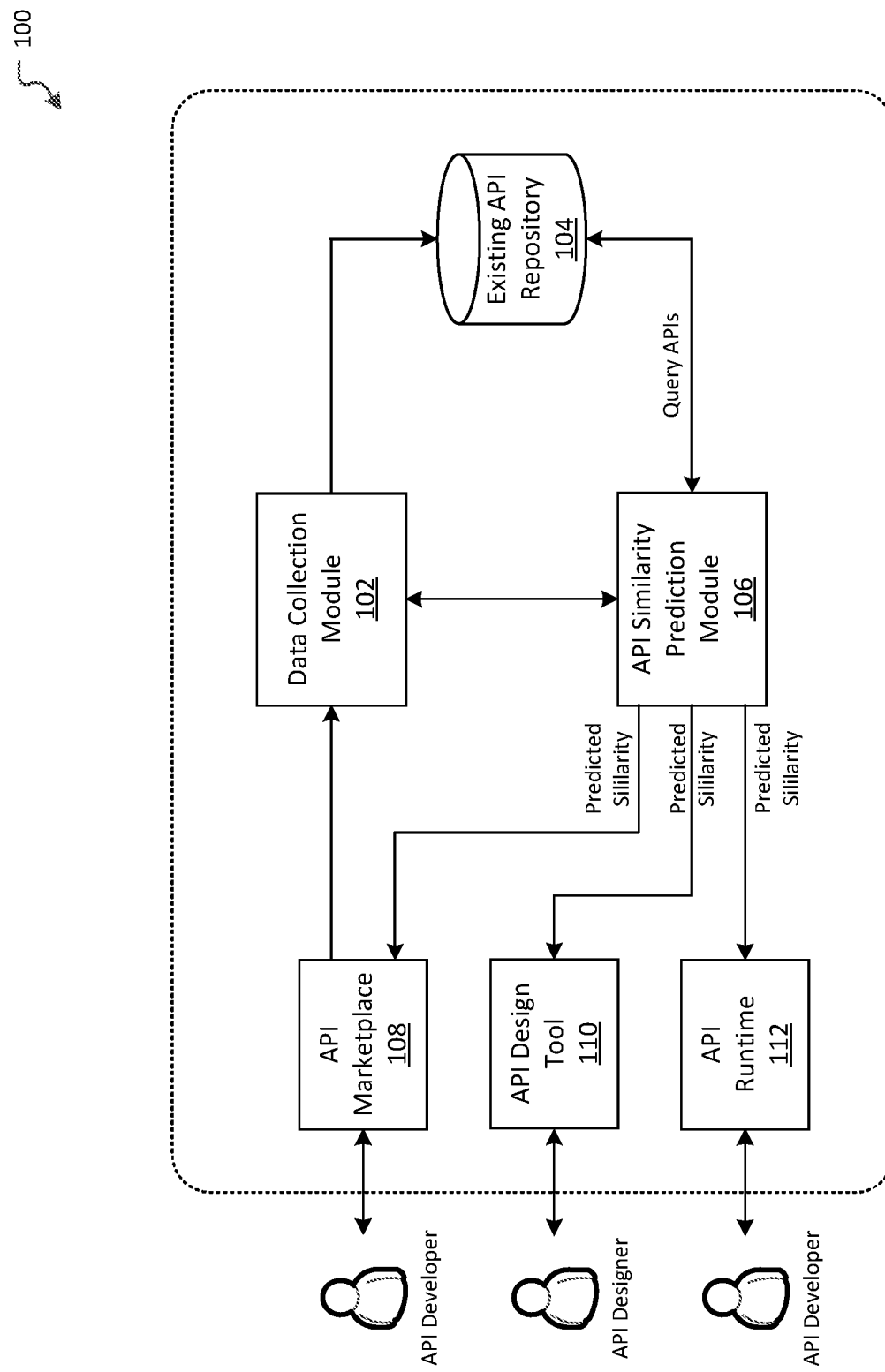
FIG. 1 shows an illustrative systems architecture for an intelligent application program interface (API) governance framework, in accordance with an embodiment of the present disclosure.

The number of application programming interfaces (APIs) in many organizations continue to grow, and for some organizations the number of APIs is at a point where proper management of the APIs is becoming an increasing challenge. For example, different departments within an organization run the risk of developing similar or, in some cases, identical APIs to those already in existence, resulting in duplication of effort and redundancy. The proliferation of redundant APIs within an organization increases the fragility and operating costs of the organization. Redundant APIs can also result in data integrity issues for an organization as well as potentially impact the security, integrity, and governance of the organization's systems supporting such APIs. This can affect consumer/customer satisfaction and reduce adoption/utilization of the APIs both internally within the organization as well as externally by third-parties and customers of the organization.

Certain embodiments of the concepts, techniques, and structures disclosed herein are directed to a framework for identifying existing APIs that are similar to a new API that is being designed based on a matching of API specifications. An API specification for an API (i.e., an API specification corresponding to an API) is a machine-readable document that provides a complete explanation of the intended operation of the corresponding API, including an understanding of how the API behaves and how it links with other APIs. The API specification also describes the components, such as the API objects, values, and parameters, how the objects are called, and what each object does. For example, an API specification for an API may describe how to invoke an endpoint (e.g., API endpoint) and the type of data that is to be sent to and received from the endpoint. The API specification may also provide other metadata such as the schema, query parameters, path segments of the API, etc. Generally, an API specification provides an indication of the context and intent of the corresponding API.

In accordance with certain of the embodiments disclosed herein, the matching of API specifications is achieved by predicting the context and intent of a new API that is being designed from its API specification. For example, an API developer (e.g., a software programmer) may create an API specification for a new API that is being designed within an organization. An API specification corresponding to a new API is sometimes referred to herein more simply as a "new API specification." In one such embodiment, natural language processing (NLP) and topic modeling algorithms can be utilized to predict the context and intent of the new API from its API specification. The API specifications corresponding to existing APIs can then searched to identify API specifications corresponding to existing APIs whose context and intent are similar to the predicted context and intent of the new API. An API specification corresponding to an existing API is sometimes referred to herein more simply as an "existing API specification." The identified existing API specifications can then be presented to the API developer to inform the API developer of the existence of existing APIs whose context and intent are similar to the predicted context and intent of the new API that is being designed. The API developer can then consider using one or more existing APIs corresponding to the presented API specifications instead of creating the new API. Accordingly, in one aspect, by virtue of the concepts disclosed herein, creation of new APIs with similar context and intent to existing APIs is minimized (and ideally eliminated). In addition, recommending reuse and adoption of existing APIs whose context and intent are similar to those of new APIs being designed reduces time and cost of developing the new APIs of similar context and intent. Further, increasing the reuse of existing APIs reduces the number of APIs to develop, manage, and govern, which reduces the operational expense of an organization. These and other advantages, variations, and embodiments will be apparent in light of this disclosure.

Referring now to the figures, FIG. 1 shows an illustrative systems architecture 100 for an intelligent application program interface (API) governance framework, in accordance with an embodiment of the present disclosure. An organization such as a company, an enterprise, or other entity that develops APIs for internal and/or external consumption, for instance, may implement and use the framework of systems architecture 100 to predict (e.g., determine) the existence of existing APIs having similar context and intent to a new API that is being designed. In some such embodiments, the new API may be an API that is being designed by the organization. As shown, systems architecture 100 includes a data collection module 102, an existing API repository 104, an API similarity prediction module 106, an API marketplace 108, one or more API design tools 110, and an API runtime 112. Systems architecture 100 can include various other hardware and software components which, for the sake of clarity, are not shown in FIG. 1. It should be appreciated that while data collection module 102, API similarity prediction module 106, API marketplace 108, API design tool 110, and API runtime 112 are illustrated by way of example to be different modules/components/platforms, in various embodiments, data collection module 102, API similarity prediction module 106, API marketplace 108, API design tool 110, and API runtime 112 may be combined in various combinations. It is also appreciated that systems architecture 100 may not include certain of the components depicted in FIG. 1. For example, in certain embodiments, systems architecture 100 may not include an API runtime 112. In some such embodiments, some or all of the functionality provided by the excluded components may be provided by one or more of the included components of systems architecture 100 or provided by one or more systems that are external to systems architecture 100. Thus, it should be appreciated that numerous configurations of systems architecture 100 can be implemented and the present disclosure is not intended to be limited to any particular one.

The various components of systems architecture 100 may be communicably coupled to one another via one or more networks (not shown). The network may correspond to one or more wired or wireless computer networks including, but not limited to, local area networks (LANs), wide area networks (WANs), personal area networks (PANs), metropolitan area networks (MANs), storage area networks (SANs), virtual private networks (VPNs), wireless local-area networks (WLAN), primary public networks, primary private networks, Wi-Fi (i.e., 802.11) networks, other types of networks, or some combination of the above.

The various components of systems architecture 100 may be implemented as computer instructions executable to perform the corresponding functions disclosed herein. The various components of systems architecture 100 may communicate or otherwise interact utilizing application program interfaces (APIs), such as a Representational State Transfer (RESTful) API or HTTP API.

Data collection module 102 is operable to collect or otherwise retrieve existing API specifications corresponding to existing APIs that are available to the organization from one or more data sources. The existing APIs may include APIs that have been created by various teams within the organization and which are made available for consumption internally within the organization and/or externally by third-parties or customers of the organization. The existing APIs may also include APIs that have been created by third-parties (e.g., API developers) and which are purchased or otherwise obtained by the organization for consumption both internally within the organization and/or externally outside the organization. In any case, in the example of FIG. 1, the organization's existing APIs and their corresponding API specifications can be maintained in API marketplace 108. In such embodiments, API marketplace 108 may be a platform or hub where the organization's existing APIs and corresponding API specifications are published or listed such that the existing API specifications can be searched to find API specifications that are of interest to developers and other end users, for example.

In some embodiments, data collection module 102 can collect the organization's existing API specifications from API marketplace 108 on a continuous or periodic basis. For example, data collection module 102 can collect API specifications corresponding to newly published or listed APIs (e.g., existing API specifications not previously collected) from API marketplace 108 according to a predetermined schedule such as, for example, every 1 day, 2 days, 3 days, or any other suitable period of time. The schedule under which the existing API specifications are collected may be configured as part of an organization's policy. Additionally or alternatively, API marketplace 108 can send or otherwise provide an API specification to data collection module 102 in response to an event occurring on API marketplace 108. For example, when a new API specification or a new version or an API specification is published or listed on API marketplace 108, API marketplace 108 can send the newly published or listed API specification or new version of the API specification to data collection module 102.

Data collection module 102 can store the collected existing API specifications as well as other information about the collected existing API specifications in existing API repository 104 where it can subsequently be retrieved and searched to identify existing API specifications that are similar to a new API specification. For example, the new API specification may correspond to an API that is being designed by the organization. Thus, existing API repository 104 can be understood as a storage point for the collected existing API specifications which can be searched to identify existing API specifications whose context and intent are similar to a context and intent of a new API specification that is being designed. Existing API repository 104 can correspond to, for example, a storage service within a cloud computing environment.

In some embodiments, data collection module 102 can store the existing API specifications in a format that allows for efficient searching of the existing API specifications based on their context and intent. To do so, data collection module 102 may utilize NLP and topic modeling algorithms to predict or otherwise determine a context and intent of each collected existing API specification. For example, for a particular existing API specification, data collection module 102 may utilize one or more ML algorithms to extract keywords from the contents of the existing API specification. For example, the keywords of a particular existing API specification may be extracted in an intelligent fashion such that the keywords correspond to or are indicative of the context and intent of the existing API specification rather than simply a list of words found the contents of the existing API specification. In some embodiments, data collection module 102 may identify keywords for a particular existing API specification using a technique such as Term Frequency-Inverse Document Frequency (TF-IDF) to transform the keywords into a format, such as a feature vector or other representation, suitable for training a machine learning (ML) model. Data collection module 102 may then index the feature vectors and store the indexed feature vectors within API repository 104 such that the existing API specifications (e.g., the API specifications corresponding to the existing APIs) can be searched based on the extracted keywords (the existing API specifications can be searched based on context and intent). A detailed discussion of techniques for generating vector representations of keywords of an existing API specification (so-called "feature extraction" techniques) is provided below in the context of FIG. 2.

API similarity prediction module 106 can, in response to receiving a new API specification, predict or otherwise identify one or more existing API specifications whose context and intent are similar to that of the new API specification (e.g., identify one or more existing API specifications that are similar to the new API specification). The identified existing API specifications can then be recommended to a developer who is creating the new API, for example. The API developer can then consider reusing and/or adopting one or more of the existing APIs whose context and intent are similar to that of the new API instead of creating another API (i.e., instead of creating the new API). To this end, in some embodiments, API similarity prediction module 106 may utilize one or more ML algorithms to extract keywords from the contents of the new API specification. For example, the keywords of the new API specification may be extracted in an intelligent fashion such that the keywords correspond to or are indicative of the context and intent of the new API specification rather than simply a list of words found the contents of the new API specification. In some embodiments, API similarity prediction module 106 may identify keywords for the new API specification using a technique such as TF-IDF to transform the keywords into a format, such as a feature vector or other representation, suitable for determining the similarities between the new API specification and the individual existing API specifications (e.g., similarities between the keywords extracted from the new API specification and the keywords extracted from the individual existing API).

In some embodiments, API similarity prediction module 106 may use a distance measure, such as cosine similarity, to identify one or more existing API specifications that are similar to the new API specification. Cosine similarity is a measure of similarity between two non-zero vectors (in this case a vector representing the keywords extracted from the new API specification and a vector representing the keywords extracted from a particular existing API specification) of an inner product space that measures the cosine of the angle between the two non-zero vectors. The value of cosine will increase as the angle between two vectors decreases, which signifies more similarity. The most similar existing API specification (i.e., the existing API specification that is most similar to the new API specification) is the one whose vector has the smallest angle (and largest cosine similarity).

In some embodiments, API similarity prediction module 106 may output the top N (e.g., N=3) most similar existing API specifications, for example, to be recommended to the developer who is creating the new API. The value of N may be configurable by the organization. In some embodiments, API similarity prediction module 106 may sort (i.e., order) the identified existing API specifications according to the similarity to the new API specification (e.g., sort the identified existing API specifications based on their respective similarity to the new API specification). Note that, in some cases, API similarity prediction module 106 may fail to identify an existing API specification as being similar to the new API specification. In other words, API similarity prediction module 106 may determine that none of the existing API specifications is sufficiently similar to the new API specification. For example, in one embodiment, API similarity prediction module 106 may compare the similarity measure (e.g., cosine similarity measure) to a predetermined threshold to determine whether an identified existing API specification is similar to the new API specification. In such embodiments, upon determining that the existing API specification that is most similar to the new API specification does not satisfy the predetermined threshold, API similarity prediction module 106 can deem the search to be a failure (e.g., fail to identify an existing API specification as being similar to the new API specification), and generate a notification indicating that a similar existing API specification could not be identified (e.g., generate a notification indicating that a similar existing API could not be identified).

As mentioned previously, API marketplace 108 may be a platform or hub where the organization's existing API specifications can be searched to find API specifications that are of interest to users. API marketplace 108 can include a user interface (UI) control that a user (e.g., API developer) can use to determine whether there are existing API specifications that are similar to a new API specification. In response to the user input (e.g., the user clicking/tapping the control), API marketplace 108 can send the new API specification along with a request to identify similar existing API specifications to API similarity prediction module 106. In response to the request, API similarity prediction module 106 can determine whether there are any existing API specifications that are similar to the new API specification and send information regarding any identified existing API specifications that are similar to the new API specification to API marketplace 108 (e.g., API similarity prediction module 106 can output information regarding any identified existing API specifications that are similar to the new API specification for recommending to the user). API marketplace 108 can then present the received information regarding the similar existing API specifications to the user.

Still referring to FIG. 1, API design tool 110 is operable to support creation of new APIs. API design tool 110 can include various UI controls that enable a user (e.g., an API designer) to create a new API specification and/or edit an existing API specification. For example, the UI controls can include controls that a user can click/tap to determine whether there are existing API specifications that are similar to a new API specification. In response to the user input (e.g., the user clicking/tapping the control), API design tool 110 can send the new API specification along with a request to identify similar existing API specifications to API similarity prediction module 106. In response to the request, API similarity prediction module 106 can determine whether there are any existing API specifications that are similar to the new API specification and send information regarding any identified existing API specifications that are similar to the new API specification to API design tool 110 (e.g., API similarity prediction module 106 can output information regarding any identified existing API specifications that are similar to the new API specification for recommending to the user). API design tool 110 can then present the received information regarding the similar existing API specifications to the user.

API runtime 112 is operable to enable the execution of APIs. For example, the organization can use API runtime 112 to deploy its APIs. In some embodiments, API runtime 112 may be included as part of the organization's API management system. In such embodiments, API runtime 112 may serve as a point of control over the organization's APIs and perform functions such as determine which API traffic is authorized to pass through the API to backend services, monitor the API traffic flowing through API runtime 112, analytics, and apply policies to enforce governance such authentication, rate limiting, load balancing, and caching, among others. In some embodiments, API runtime 112 may provide capabilities to deploy new APIs. For example, a user (e.g., API developer) can deploy a new API within API runtime 112. In response to the deployment of the new API, API runtime 112 can send a new API specification corresponding to the deployed new API along with a request to identify similar existing API specifications to API similarity prediction module 106. In some embodiments, the individual API specifications may be associated with a signature which may be generated using the metadata associated with an API specification. Then, when the new API is deployed within API runtime 112, the user may provide a signature of an API specification corresponding to the new API that is being deployed (e.g., provide a signature of a new API specification). API runtime 112 can then use the signature provided by the user to identify the new API specification (i.e., identify the API specification corresponding to the new API being deployed) and send the new API specification corresponding to the deployed new API along with a request to identify similar existing API specifications to API similarity prediction module 106. In some embodiments, API runtime 112 may send or otherwise provide a signature of a new API specification to API similarity prediction module 106 and API similarity prediction module 106 may use the provided signature to identify a corresponding new API specification.

In response to the request, API similarity prediction module 106 can determine whether there are any existing API specifications that are similar to the new API specification and send information regarding any identified existing API specifications that are similar to the new API specification to API runtime 112 (e.g., API similarity prediction module 106 can output information regarding any identified existing API specifications that are similar to the new API specification). API runtime 112 can then present the received information regarding the similar existing API specifications to the user. In one embodiment, API runtime 112 may send the information regarding the similar existing API specifications to an API management system (e.g., the organization's API management system).

Figure 2:
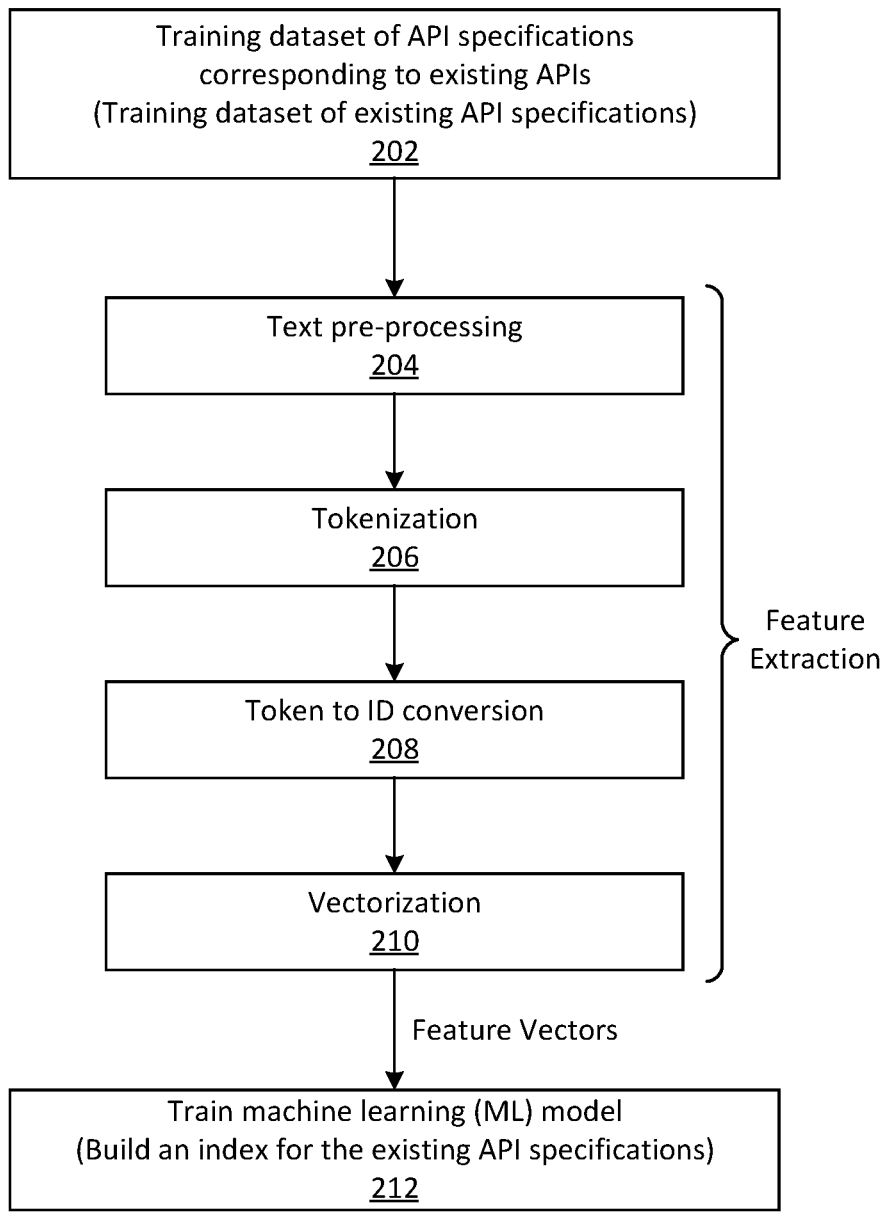
FIG. 2 is a flow diagram of an illustrative process for training a machine learning (ML) model for prediction of similar application programming interface (API) specifications, in accordance with an embodiment of the present disclosure.

FIG. 2 is a flow diagram of an illustrative process 200 for training a machine learning (ML) model for prediction of similar application programming interface (API) specifications, in accordance with an embodiment of the present disclosure. Process 200 may be implemented or performed by any suitable hardware, or combination of hardware and software, including without limitation the components of systems architecture 100 shown and described with respect to FIG. 1, the computing device shown and described with respect to FIG. 4, or a combination thereof. For example, in some embodiments, the operations, functions, or actions illustrated in process 200 may be performed, for example, in whole or in part by data collection module 102 and API marketplace 108, or any combination of these including other components of systems architecture 100 described with respect to FIG. 1.

With reference to process 200, at 202, a training dataset may be received. For example, the training dataset may include the existing API specifications (i.e., the API specifications corresponding to the existing APIs) collected by data collection module 102.

At 204, the existing API specifications within the training dataset may be pre-processed to transform the contents of the individual existing API specifications into a predictable and analyzable form for extracting keywords. In particular, for individual existing API specifications within the training dataset, the pre-processing can include removal of stop words, stemming, lemmatization, conversion to lower case, removal of punctuation, and removal of bad/unwanted characters, among others, from the raw/unstructured text within the existing API specification. In some embodiments, Natural Language Toolkit (NLTK), Gensim, or another open-source project may be used to pre-process the contents of the existing API specifications within the training dataset.

At 206, for individual existing API specifications within the training dataset, text from the existing API specifications may be extracted using feature engineering. In particular, the pre-processed text within the individual existing API specifications can be converted into a matrix of tokens. In some embodiments, NLTK word tokenizer may be used to tokenize the contents (e.g., pre-processed text) of the existing API specifications. In some embodiments, NLTK sentence tokenizer may also be used to tokenize the contents of the existing API specifications. The sentence tokenizer provides a count of the average words per sentence, and the word tokenizer and the sentence tokenizer are used to calculate the ratio.

At 208, the tokens may be converted to their unique identifiers (IDs) to place the data into a format that is suitable for training the ML model. For example, since ML and NLP algorithms deal with numerical values, the tokens (also known as "words") may be converted to numerical values. In some embodiments, Gensim Dictionary object may be leveraged to map the individual tokens (words) into unique IDs.

A bag of words (BoW) may be created for the individual existing API specifications within the training dataset. A BoW created for a particular existing API specification can be a vector representation of the tokens (words) appearing in the existing API specification and the frequency of each token (word) in the existing API specification (e.g., count of the number of times each token appears in the existing API specification). In some embodiments, Gensim Dictionary object may be used to create a BoW corpus for the existing API specifications.

At 210, for individual existing API specifications within the training dataset, a TF-IDF calculation may be performed using the tokens produced for the existing API specification. The tokens produced for an existing API specification may represent the keywords. TF-IDF is a statistical algorithm that evaluates how important a token (word) is to a document (e.g., an existing API specification). The importance of a token (word) increases proportionally to the number of times the token (word) appears in an existing API specification but is offset by the frequency of the token (word) in the corpus of existing API specifications (e.g., the training dataset). TF-IDF can be calculated by multiplying a local component (TF) with a global component (IDF) and optionally normalizing the result to unit length. Term frequency (TF) refers to the frequency of a particular token within a single existing API specification, and inverse document frequency (IDF) scales the value by how rare the token (word) is in the corpus of existing API specifications. In other words, tokens (words) that occur more frequently across the training dataset get smaller weights. A TF-IDF vector (e.g., a feature vector) generated using TF and IDF can denote how important particular tokens (words) in an existing API specification are in the context of the training dataset. In some embodiments, the TfIdfModel within the Gensim library may be used to generate the feature vectors. In other embodiments, a suitable TF-IDF vectorizer, such as, for example, the TfidfVectorizer class within the scikit-learn library, may be used to generate the feature vectors.

At 212, the feature vectors corresponding to the existing API specifications within the training dataset may be used to train the ML model. Note that, as an instance-based learning algorithm, the training phase of ML algorithm comprises only of storing the set of feature vectors corresponding to the existing API specifications within the training dataset. The stored feature vectors can be subsequently queried for similarities across the existing API specifications. In some embodiments, a Similarity object within the Gensim library may be leveraged to build an index for a given set of existing API specifications (e.g., an index of the feature vectors corresponding to the existing API specifications within the training dataset). The generated index for the set of existing API specifications can be stored and subsequently searched to identify existing API specifications that are similar to a new API specification.

Figure 3:
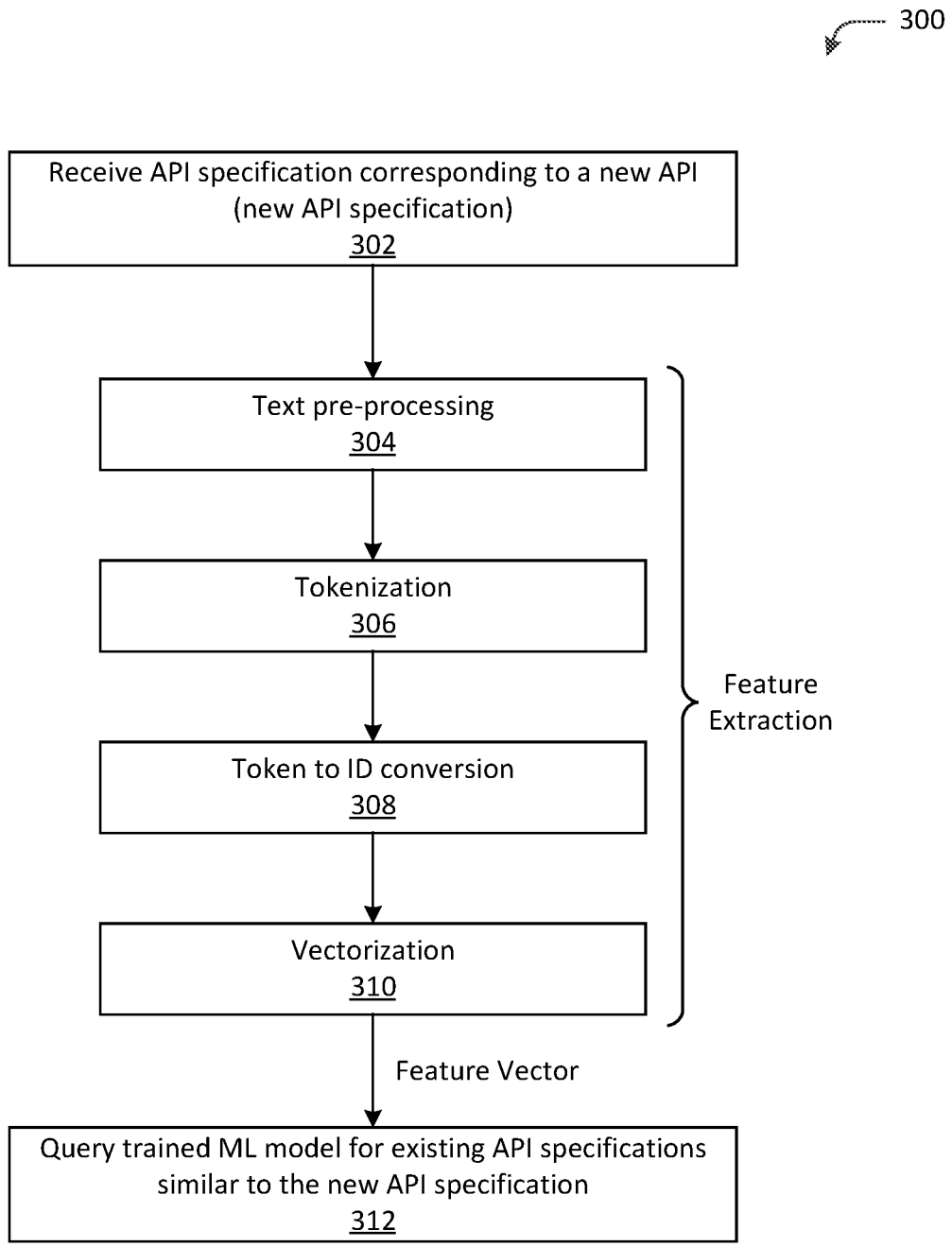
FIG. 3 is a flow diagram of an example process for identifying application programming interface (API) specifications corresponding to existing APIs that are similar to an API specification corresponding to a new API, in accordance with an embodiment of the present disclosure.

FIG. 3 is a flow diagram of an example process 300 for identifying application programming interface (API) specifications corresponding to existing APIs that are similar to an API specification corresponding to a new API, in accordance with an embodiment of the present disclosure. Process 300 may be implemented or performed by any suitable hardware, or combination of hardware and software, including without limitation the components of systems architecture 100 shown and described with respect to FIG. 1, the computing device shown and described with respect to FIG. 4, or a combination thereof. For example, in some embodiments, the operations, functions, or actions illustrated in process 300 may be performed, for example, in whole or in part by API similarity prediction module 102, API design tool 110, and API runtime 112, or any combination of these including other components of systems architecture 100 described with respect to FIG. 1.

With reference to process 300, at 302, an API specification corresponding to a new API may be received. The new API specification may be received with a request to identify similar existing API specifications (e.g., a request to identify existing API specifications similar to the new API specification). For example, the new API specification may be received from one of API marketplace 108, API design tool 110 or API runtime 112 with the request to identify similar existing API specifications.

At 304, the new API specification may be pre-processed to transform the contents of the new API specification into a predictable and analyzable form for extracting keywords. In particular, the pre-processing can include removal of stop words, stemming, lemmatization, conversion to lower case, removal of punctuation, and removal of bad/unwanted characters, among others, from the raw/unstructured text within the new API specification. In some embodiments, Natural Language Toolkit (NLTK), Gensim, or another open-source project may be used to pre-process the contents of the new API specification.

At 306, text from the new API specification may be extracted using feature engineering. In particular, the pre-processed text within the new API specification can be converted into tokens. In some embodiments, NLTK word tokenizer may be used to tokenize the contents (e.g., pre-processed text) of new API specification. In some embodiments, NLTK sentence tokenizer may also be used to tokenize the contents of the new API specification. The sentence tokenizer provides a count of the average words per sentence, and the word tokenizer and the sentence tokenizer are used to calculate the ratio.

At 308, the tokens may be converted to their unique IDs to place the data into a format that is suitable for use with the ML model. For example, since ML and NLP algorithms deal with numerical values, the tokens (words) may be converted to numerical values. In some embodiments, Gensim Dictionary object may be leveraged to map the individual tokens (words) into unique IDs. A BoW may then be created for the new API specification. The BoW created for the new API specification can be a vector representation of the tokens (words) and the frequency of each token (word) in the new API specification (e.g., count of the number of times each token appears in the new API specification). In some embodiments, Gensim Dictionary object may be used to create the BoW for the new API specification.

At 310, a TF-IDF calculation may be performed using the tokens produced for the new API specification to generate a feature vector for the new API specification. The tokens produced for the new API specification may represent the keywords of the new API specification. As described above, TF-IDF is a statistical algorithm that evaluates how important a token (word) is to a document (e.g., a new API specification). In some embodiments, the TfIdfModel within the Gensim library may be used to generate the feature vector. In other embodiments, a suitable TF-IDF vectorizer, such as, for example, the TfidfVectorizer class within the scikit-learn library, may be used to generate the feature vector.

At 312, a trained ML model may be queried for existing API specifications that are similar to the new API specification. For example, the trained ML model may be the index for the set of existing API specifications (e.g., an index of the feature vectors corresponding to the existing API specifications within the training dataset) built or generated at 212 of process 200 of FIG. 2 described above.

In some embodiments, cosine similarity can be used as the distance measure to identify one or more existing API specifications that are similar to the new API specification. In other embodiments, other measures of similarity, such as Euclidean distance or Manhattan distance, can be used as the distance measure. Cosine similarity is a measure of similarity between two non-zero vectors (in this case a vector representing the keywords extracted from the new API specification and a vector representing the keywords extracted from a particular existing API specification) of an inner product space that measures the cosine of the angle between the two non-zero vectors. As such, cosine similarity is a judgment of orientation, and not magnitude. In this vector space model, each existing API specification can be stored as a vector of its features (e.g., metadata) in a multi-dimensional space and the angle between two vectors (e.g., vector representing the features from a new API specification and a vector representing the features from an existing API specification) can be calculated to determine the similarity of the vectors. The method of determining a similar existing API specification is by calculating the cosine of the angle between a vector representing the features from a new API specification and a vector representing the features from an existing API specification. Two vectors with the same orientation will have 0 degrees between them and a cosine similarity of 1 (cos (0)=1). Two vectors that are completely different from each other (diametrically opposite) will have a magnitude of 180 degrees between them and a cosine similarity of −1 (cos (180)=−1). Two vectors that have a magnitude of 90 degrees will have cosine similarity of 1 (cos (90)=1). The value of cosine will increase as the angle between two vectors decreases, which signifies more similarity. The most closely matching (i.e., most similar) existing API specification is the one whose vector has the smallest angle (and largest cosine similarity).

In some embodiments, the trained ML model may predict the top N (e.g., N=3) most similar existing API specifications in response to the query for existing API specifications that are similar to the new API specification. In some embodiments, the identified (predicted) similar existing API specifications may be sorted (i.e. ordered) according to the similarity to the new API specification. The value of N may be configurable by the organization. In some embodiments, the value of N may be a parameter of a request (e.g., a request to identify similar existing API specifications) such that the value can be dynamically adjusted by a user (e.g., an API designer/developer). Note that, in some cases, none or less than N existing API specifications may be identified as being similar to the new API specification. The identified similar existing API specifications may then be output, for example, to be recommended to a user, such as an API designer/developer, who is creating the new API.

Figure 4:
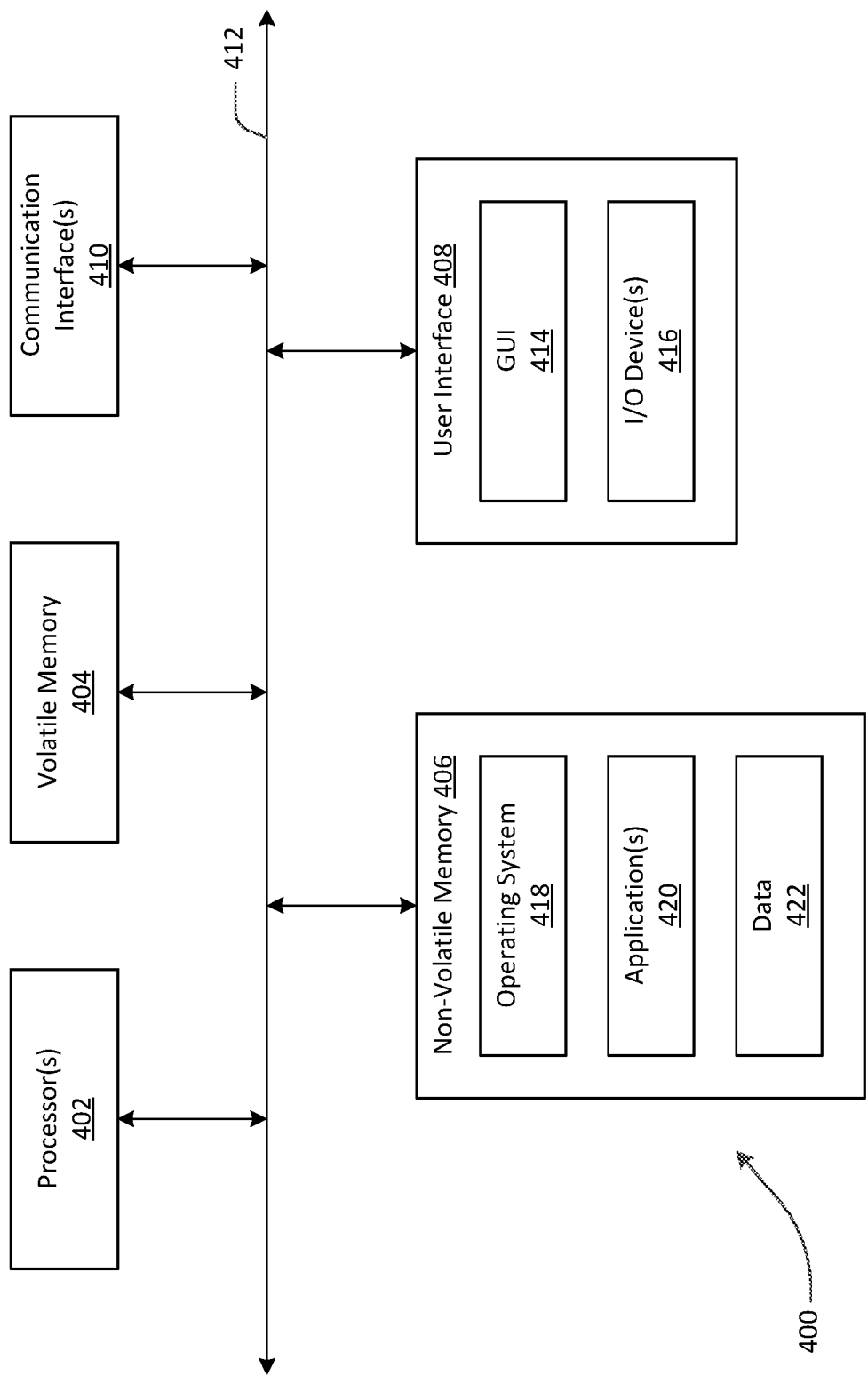
FIG. 4 is a block diagram illustrating selective components of an example computing device in which various aspects of the disclosure may be implemented, in accordance with an embodiment of the present disclosure.

FIG. 4 is a block diagram illustrating selective components of an example computing device 400 in which various aspects of the disclosure may be implemented, in accordance with an embodiment of the present disclosure. As shown, computing device 400 includes one or more processors 402, a volatile memory 404 (e.g., random access memory (RAM)), a non-volatile memory 406, a user interface (UI) 408, one or more communications interfaces 410, and a communications bus 412.

Non-volatile memory 406 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 408 may include a graphical user interface (GUI) 414 (e.g., a touchscreen, a display, etc.) and one or more input/output (I/O) devices 416 (e.g., a mouse, a keyboard, a microphone, one or more speakers, one or more cameras, one or more biometric scanners, one or more environmental sensors, and one or more accelerometers, etc.).

Non-volatile memory 406 stores an operating system 418, one or more applications 420, and data 422 such that, for example, computer instructions of operating system 418 and/or applications 420 are executed by processor(s) 402 out of volatile memory 404. In one example, computer instructions of operating system 418 and/or applications 420 are executed by processor(s) 402 out of volatile memory 404 to perform all or part of the processes described herein (e.g., processes illustrated and described in reference to FIGS. 1 through 3). In some embodiments, volatile memory 404 may include one or more types of RAM and/or a cache memory that may offer a faster response time than a main memory. Data may be entered using an input device of GUI 414 or received from I/O device(s) 416. Various elements of computing device 400 may communicate via communications bus 412.

The illustrated computing device 400 is shown merely as an illustrative client device or server and may be implemented by any computing or processing environment with any type of machine or set of machines that may have suitable hardware and/or software capable of operating as described herein.

Processor(s) 402 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 402 may be analog, digital or mixed signal. In some embodiments, processor 402 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 410 may include one or more interfaces to enable computing device 400 to access a computer network such as a Local Area Network (LAN), a Wide Area Network (WAN), a Personal Area Network (PAN), or the Internet through a variety of wired and/or wireless connections, including cellular connections.

In described embodiments, computing device 400 may execute an application on behalf of a user of a client device. For example, computing device 400 may execute one or more virtual machines managed by a hypervisor. Each virtual machine may provide an execution session within which applications execute on behalf of a user or a client device, such as a hosted desktop session. Computing device 400 may also execute a terminal services session to provide a hosted desktop environment. Computing device 400 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method comprising:
   receiving a new application programming interface (API) specification, wherein the new API specification corresponds to a new API that is being designed and not yet developed;
   extracting one or more keywords from the new API specification;
   identifying, using a trained machine learning (ML) model, one or more existing API specifications that are similar to the new API specification based on the one or more keywords from the new API specification, wherein the trained ML model includes a set of feature vectors corresponding to a plurality of existing API specifications; and
   responsive to the identification, outputting information regarding the one or more existing API specifications that are similar to the new API specification.

2. The method of claim 1, wherein the new API specification corresponds to a new API that is being designed.

3. The method of claim 1, wherein the outputting includes ordering the one or more existing API specifications according to similarity to the new API specification.

4. The method of claim 1, wherein the one or more extracted keywords are indicative of a context and intent of the new API specification.

5. The method of claim 1, wherein the identifying one or more existing API specifications further comprises:
   generating a feature vector based on the extracted one or more keywords; and
   using the feature vector and the trained ML model to predict the one or more existing API specifications that are similar to the new API specification.

6. The method of claim 5, wherein generating the feature vector includes using Term Frequency-Inverse Document Frequency (TF-IDF).

7. The method of claim 1, wherein the identifying one or more existing API specifications is based on cosine similarity.

8. The method of claim 1, wherein the new API specification is received from an API marketplace associated with an organization.

9. The method of claim 1, wherein the new API specification is received from an API design tool associated with an organization.

10. The method of claim 1, wherein the new API specification is received from an API runtime associated with an organization.

11. A system comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
    receiving a new application programming interface (API) specification, wherein the new API specification corresponds to a new API that is being designed and not yet developed;
    extracting one or more keywords from the new API specification;
    identifying, using a trained machine learning (ML) model, one or more existing API specifications that are similar to the new API specification based on the one or more keywords from the new API specification, wherein the trained ML model includes a set of feature vectors corresponding to a plurality of existing API specifications; and
    responsive to the identification, outputting information regarding the one or more existing API specifications that are similar to the new API specification.

12. The system of claim 11, wherein the outputting includes to order the one or more existing API specifications according to similarity to the new API specification.

13. The system of claim 11, wherein the one or more extracted keywords are indicative of a context and intent of the new API specification.

14. The system of claim 11, wherein the identifying one or more existing API specifications further comprises:
    generating a feature vector based on the extracted one or more keywords; and
    using the feature vector and the trained ML model to predict the one or more existing API specifications that are similar to the new API specification.

15. The system of claim 14, wherein generating the feature vector includes using Term Frequency-Inverse Document Frequency (TF-IDF).

16. The system of claim 11, wherein the identifying one or more existing API specifications is based on cosine similarity.

17. The system of claim 11, wherein the new API specification is received from one of an API marketplace, an API design tool, or an API runtime associated with an organization.

18. A non-transitory computer-readable medium storing program instructions that are executable to:
- receive, by a computing device, a new application programming interface (API) specification, wherein the new API specification corresponds to a new API that is being designed and not yet developed;
- extract, by the computing device, one or more keywords from the new API specification;
- identify, by the computing device using a trained machine learning (ML) model, one or more existing API specifications that are similar to the new API specification based on the one or more keywords from the new API specification, wherein the trained ML model includes a set of feature vectors corresponding to a plurality of existing API specifications; and
- responsive to the identification, output, by the computing device, information regarding the one or more existing API specifications that are similar to the new API specification.

* * * * *